US010168789B1

(12) United States Patent
Soto et al.

(10) Patent No.: US 10,168,789 B1
(45) Date of Patent: Jan. 1, 2019

(54) SYSTEMS AND METHODS TO FACILITATE USER INTERACTIONS WITH VIRTUAL CONTENT HAVING TWO-DIMENSIONAL REPRESENTATIONS AND/OR THREE-DIMENSIONAL REPRESENTATIONS

(71) Applicant: Meta Company, San Mateo, CA (US)

(72) Inventors: Diego Leyton Soto, San Mateo, CA (US); Cecilia Abadie, Montara, CA (US); Florian Benjamin Radke, Pleasant Hill, CA (US)

(73) Assignee: Meta Company, San Mateo, CA (US)

( * ) Notice: Subject to any disclaimer, the term of this patent is extended or adjusted under 35 U.S.C. 154(b) by 44 days.

(21) Appl. No.: 15/610,168

(22) Filed: May 31, 2017

(51) Int. Cl.
*G06F 3/01* (2006.01)
*G02B 27/01* (2006.01)
*G06T 19/00* (2011.01)
*G06T 11/60* (2006.01)
*G06T 15/06* (2011.01)
G06F 3/0488 (2013.01)
G06F 3/0481 (2013.01)

(52) U.S. Cl.
CPC ......... *G06F 3/017* (2013.01); *G02B 27/0172* (2013.01); *G06T 11/60* (2013.01); *G06T 15/06* (2013.01); *G06T 19/006* (2013.01); *G02B 2027/014* (2013.01); *G02B 2027/0138* (2013.01); *G02B 2027/0141* (2013.01); *G06F 3/04815* (2013.01); *G06F 3/04883* (2013.01)

(58) Field of Classification Search
CPC .............. G06F 3/017; G06F 3/04815; G02B 2027/0178; G06T 19/006
See application file for complete search history.

(56) References Cited

U.S. PATENT DOCUMENTS

| 9,983,697 B1* | 5/2018 | Gribetz ............... G06F 3/03545 |
| 2002/0158905 A1 | 10/2002 | Bazzoni |
| 2009/0070093 A1 | 3/2009 | Nakanishi |
| 2010/0177931 A1 | 7/2010 | Whytock |
| 2012/0229454 A1 | 9/2012 | Hayashi |
| 2013/0104084 A1 | 4/2013 | Mlyniec |

(Continued)

OTHER PUBLICATIONS

Interational Search Report and Written Opinion for PCTIB2017052948 dated Aug. 11, 2017, 16 pages.

*Primary Examiner* — Michael A Faragalla
*Assistant Examiner* — Nathaniel P Brittingham
(74) *Attorney, Agent, or Firm* — Sheppard Mullin Richter & Hampton LLP

(57) ABSTRACT

Systems and methods to facilitate user interactions with virtual content having two-dimensional representations and three-dimensional representations are presented herein. The system may include one or more of a headset, a mobile computing platform, and/or other components. The headset may be configured to provide an interactive space by generating images of virtual content that are superimposed over the user's view of the real-world. The interactive space may include views of virtual content having three-dimensional representation. The mobile computing platform may be configured to present virtual content having two-dimensional representations. The user may perform gestures to "move" virtual content from the two-dimensional representation on the mobile computing platform to a three-dimensional representation within the interactive space.

18 Claims, 8 Drawing Sheets

(56) References Cited

U.S. PATENT DOCUMENTS

| | | | | |
|---|---|---|---|---|
| 2013/0117377 A1* | 5/2013 | Miller | .................... | H04L 67/38 |
| | | | | 709/205 |
| 2014/0152558 A1* | 6/2014 | Salter | .................... | G06F 3/013 |
| | | | | 345/157 |
| 2014/0198101 A1* | 7/2014 | Vilkin | .................... | G06T 13/20 |
| | | | | 345/419 |
| 2014/0204002 A1 | 7/2014 | Bennet | | |
| 2014/0267637 A1* | 9/2014 | Hoberman | ............ | G06F 1/1626 |
| | | | | 348/53 |
| 2014/0306891 A1* | 10/2014 | Latta | ................. | G06F 3/017 |
| | | | | 345/158 |
| 2015/0371441 A1* | 12/2015 | Shim | ................. | G06T 17/00 |
| | | | | 345/420 |
| 2017/0060230 A1 | 3/2017 | Faaborg | | |
| 2017/0235143 A1 | 8/2017 | Chi | | |
| 2017/0336941 A1* | 11/2017 | Gribetz | ............... | G06F 3/04815 |

\* cited by examiner

SYSTEMS AND METHODS TO FACILITATE USER INTERACTIONS WITH VIRTUAL CONTENT HAVING TWO-DIMENSIONAL REPRESENTATIONS AND/OR THREE-DIMENSIONAL REPRESENTATIONS

FIELD OF THE INVENTION

The systems and methods described herein relate to facilitating user interactions with virtual content having two-dimensional representations and/or three-dimensional representations.

BACKGROUND OF THE INVENTION

There are many types of vision systems that provide virtual and/or augmented reality (AR) displays. In particular, wearable technology such as head mounted displays (HMD) may be used.

SUMMARY

One or more implementations of the systems and methods described herein facilitate user interactions with virtual content having two-dimensional representations and/or three-dimensional representations. The two-dimensional representations of virtual content may be presented on a display of a mobile computing platform. The three-dimensional representations of virtual content may be facilitated by images formed by a headset. The three-dimensional representations may be perceived within a three-dimensional interactive space. A user may make a gesture to "move" the virtual content shown on the display of the mobile computing platform to the interactive space such that the virtual content may be perceived as being present within the interactive space.

An interactive space may include one or both of a virtual reality environment and/or an augmented reality environment. An augmented reality environment may include views of images of virtual content superimposed over views of a real-world environment. A virtual reality environment may include views of images of virtual content within a virtual environment.

A system configured to facilitate user interactions with virtual content having two-dimensional representations and/or three-dimensional representations may include one or more of a mobile computing platform, a headset, a set of one or more physical processors coupled to the headset, one or more image forming components held by the headset, a depth sensor held by the headset, and/or other components.

The mobile computing platform may comprise one or more of a display, a first sensor, a set of one or more physical processors, and/or other components. The first sensor may be configured to generate output signals conveying presence of a user object of a user at or near the display and/or the first sensor. The set of one or more physical processors may be configured by machine-readable instructions. The machine-readable instructions may include one or more computer program components. The one or more computer program components may include one or more of a presentation component, a presence component, and/or other components.

The presentation component may be configured to effectuate presentation of first virtual content on the display of the mobile computing platform. The first virtual content may have a two-dimensional representation while presented on the display.

The presence component may be configured to obtain output signals generated by the first sensor, and/or determine, from the output signals generated by the first sensor, the presence of the user object at or near the display.

The headset may be configured to be installed on a head of the user. The depth sensor held by the headset may be configured to generate output signals conveying ranges of surfaces within a real-world environment. The one or more image forming components held by the headset may be configured to generate light rays to form images of virtual content. The one or more image forming components may be configured such that when the headset is installed on the head of the user, the images may be superimposed over a view of the real world environment to create an interactive space.

The set of one or more physical processors coupled to the headset may be configured by machine-readable instructions. The machine-readable instructions may include one or more computer program components. The one or more computer program components may include one or more of a gesture component, a presence component, a control component, and/or other components.

The gesture component may be configured to obtain output signals generated by the depth sensor, and/or determine, from the output signals of the depth sensor, one or more gestures being performed by the user object and/or other real-world objects. The presence component may be configured to obtain, from the mobile computing platform, an indication of the presence of the user object at or near the display and/or the first sensor of the mobile computing platform. It is noted that the positioning of the first sensor with respect to the display may mean that presence of user object at or near the first sensor may be the same as presence of the user object at or near the display.

The control component may be configured to, responsive to obtaining the indication of presence of the user object at or near the display and/or first sensor, and determining a first gesture is being performed by the user object, control the one or more image forming components to form images of second virtual content. The second virtual content may be a three-dimensional representation of the first virtual content. The images of the second virtual content may be formed such that the second virtual content may be superimposed over the user's view of the user object over a duration of the performance of the first gesture.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits. As used in the specification and in the claims, the singular form of "a", "an", and "the" include plural referents unless the context clearly dictates otherwise.

DETAILED DESCRIPTION

Figure 1:
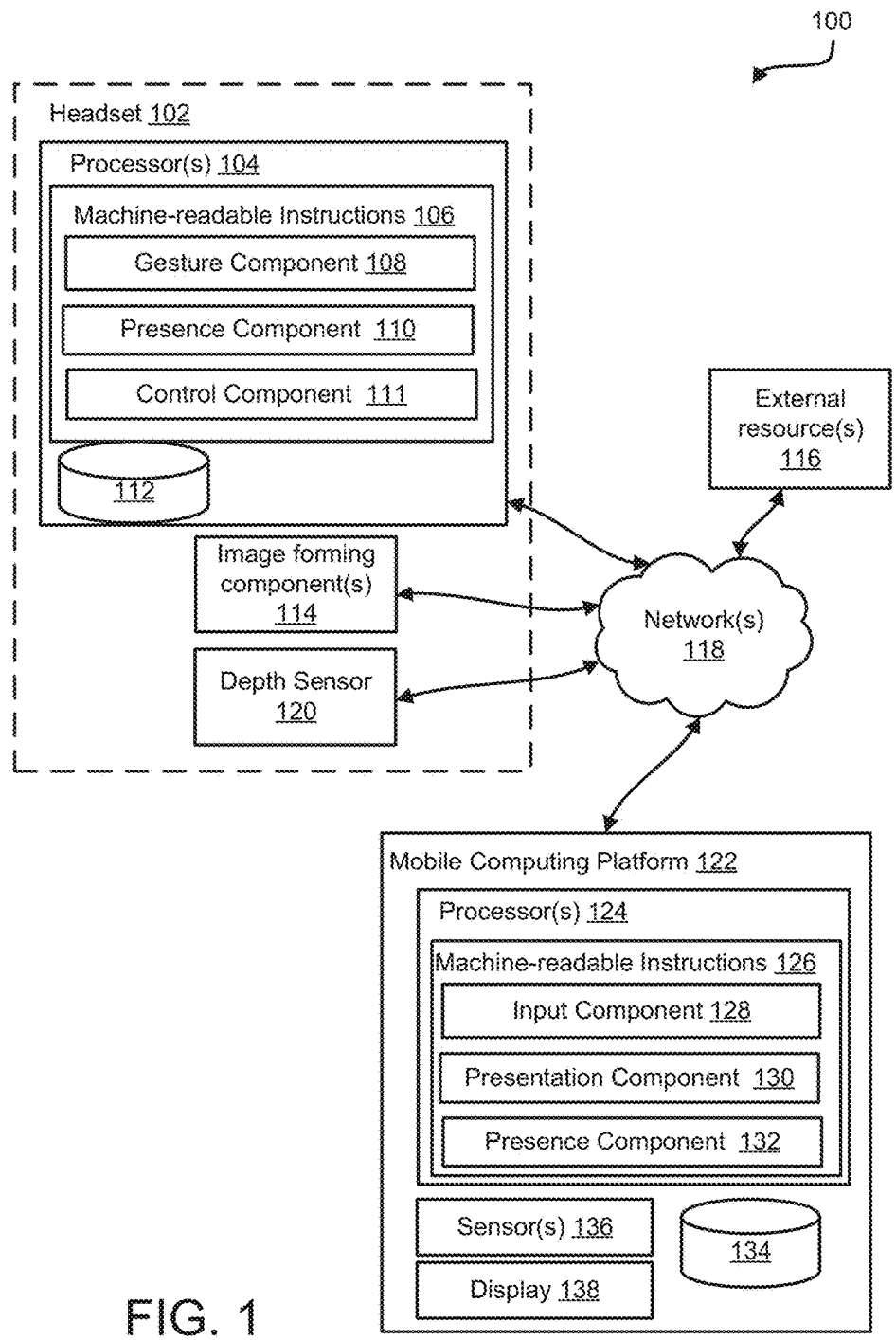
FIG. 1 illustrates a system configured to facilitate user interactions with virtual content having two-dimensional representations and/or three-dimensional representations, in accordance with one or more implementations.

FIG. 1 shows a system 100 configured to facilitate user interactions with virtual content having two-dimensional representations and/or three-dimensional representations, in accordance with one or more implementations. In particular, system 100 may be configured to facilitate user interactions with virtual content having a two-dimensional representation when shown on a display of a mobile computing platform and a three-dimensional representation when viewed within a three-dimensional interactive space. A user may make a gesture to "move" the virtual content shown on the display of the mobile computing platform to the interactive space.

An interactive space may include one or both of an augmented reality environment and/or a virtual reality environment. An augmented reality environment may include views of the images of virtual content superimposed over the views of the real-world. A virtual reality environment may include views of virtual content within a virtual environment. The terms "space" and "environment" may be used interchangeably herein. Virtual content may include one or more of virtual objects, virtual worlds, and/or other virtual content.

The human perceptual system can combine various sensory cues in an efficient manner in order to perceive "physically plausible" virtual content in a real-world environment. For example, the human perceptual system can integrate, among other things, sensory cues such as one or more of luminance, depth, and/or shape information to form or perceive coherent virtual content. Virtual content may include one or more virtual objects, and/or other content. As a result, the properties of the human perception may be exploited through visual systems, as described herein, employing hardware and/or software architectures to form virtual content (e.g., digital images) that may be located and/or perceived to be located in the real-world environment by virtue of neuroscience principles.

The system 100 may include one or more of a headset 102, one or more physical processors 104, one or more image forming components 114, a depth sensor 120, a mobile computing platform 122, and/or other components.

In some implementations, one or more components of system 100 may be included with and/or otherwise held by headset 102. The headset 102 may be configured to be installed (e.g., worn) on a head of a user. By way of non-limiting illustration, headset 102 may include one or more of a head-mounted display (HMD) (see, e.g., FIG. 5), glasses, and/or other devices. The headset 102 may include and/or may be coupled with one or more of one or more physical processors 104, one or more image forming components 114, depth sensor 120, and/or other components.

In some implementations, one or more components of system 100 may be included in one or more devices external to headset 102. For example, one or more components may be included in one or more of a desktop computer, a laptop computer, other mobile computer configurations, and/or other devices. By way of non-limiting illustration, one or more physical processors 104 and/or other components may be included in a mobile computing device external to headset 102. The headset 102 may be tethered and/or otherwise connected to one or more external devices. Such connection may be wired (e.g., USB and/or other wired connection) and/or wireless (e.g., Bluetooth, Wi-Fi, and/or other wireless connection).

Figure 5:
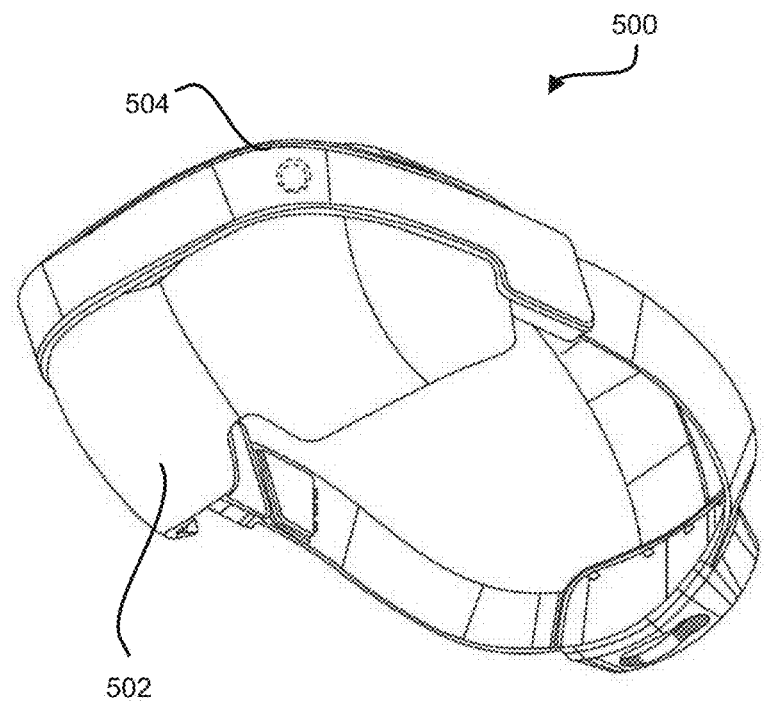
FIG. 5 illustrates an exemplary head-mounted display.

Referring now to FIG. 5, in some implementations, a headset (e.g., headset 102 in FIG. 1) may comprise an HMD 500. One or more components of system 100 (FIG. 1) may be held by and/or comprise part of HMD 500. By way of non-limiting illustration, an optical element of an image forming component may comprise at least part of a visor portion 502 of HMD 500. Components including physical processors, light sources of image forming components, a depth sensor, and/or other components may be incorporated into a housing portion 504 and/or other portions of HMD 500.

Returning to FIG. 1, individual image forming components of one or more image forming components 114 may be configured to generate light rays to form images of virtual content. Virtual content may be perceived within a viewing user's field-of-view. Virtual content may be focused at one or more focal planes.

Individual ones of one or more image forming components 114 may include one or more of one or more light sources, one or more optical elements, and/or other components. In some implementations, an individual light source may be arranged on a headset to direct light rays toward one or more optical elements. The one or more image forming components 114 may be configured such that images of virtual content may be superimposed over a view of the real world to create an interactive space. In some implementations, images may be presented individually to each eye of the user as stereo image pairs.

A light source may comprise one or more of a microelectromechanical systems (MEMS) RGB laser scanner, a microLED microdisplay, an LED illuminated liquid crystal on silicon (LCOS) microdisplay, an RGB laser LCOS microdisplay, a digital light projector (DLP), a digital micromirror device (DMD), a liquid crystal display (LCD), an organic light-emitting diode (OLED) display, an OLED microdisplay, and/or other light sources.

It is noted that the use of the term "light ray" is not intended to limit the scope of the disclosure to single, discrete, photons and/or packets of photons. Instead, the disclosure may envision a light ray to mean a light beam comprising multiple and continuous photons, in one or more implementations.

In some implementations, one or more optical elements of one or more image forming components 114 may be arranged on headset 102 such that, when headset 102 is installed on the head of a user, the user's gaze may be directed toward the one or more optical elements. In some implementations, an optical element may form at least part of a portion of headset 102 through which a user may view the real-world. In some implementations, an optical element may comprise one or more reflective and/or partially reflective surfaces. An optical element may be formed from a reflective and/or partially reflective material. An optical element may be formed from a transparent and/or partially transparent material. A material of an optical element may comprise one or more of ZEONEX, Cyclo Olefin Polymer (COP), Cyclic Olefin Copolymer (COC), polycarbonate, Poly (methyl methacrylate) (PMMA), and/or other materials.

In some implementations, one or more optical elements of one or more image forming components 114 may be arranged on headset 102 such that, when headset 102 is installed on the head of the user, light rays generated by one or more light sources may be directed onto the one or more optical elements to form images of virtual content on the one or more optical elements. The images of virtual content on the one or more optical elements may be superimposed over the user's view of the real world through the one or more optical elements to create an interactive space.

In some implementations, an optical element may comprise one or more of a waveguide, optical coupling features, and/or other components. A waveguide may include one or more of a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. Light rays coupled into a waveguide may be propagated through the waveguide and directed out of the waveguide toward one or more eyes of a user.

In some implementations, an optical element may comprise a planar partial mirror array waveguide and/or other components. The light rays from a light source may be coupled into the waveguide at an entrance of the waveguide, and propagated to a partial mirror array region of the waveguide by total internal reflection. The light rays may be reflected by the partial mirror array and directed toward the user's eye.

In some implementations, one or more optical elements of one or more image forming components 114 may be arranged on headset 102 such that light rays generated by one or more light sources may be directed at the one or more optical elements, coupled into the one or more optical elements, and directed out of the one or more optical element into an eye of a user. The images of virtual content may be projected onto a retina of an eye such that the images may be superimposed over the user's view of the real world.

Figure 3:
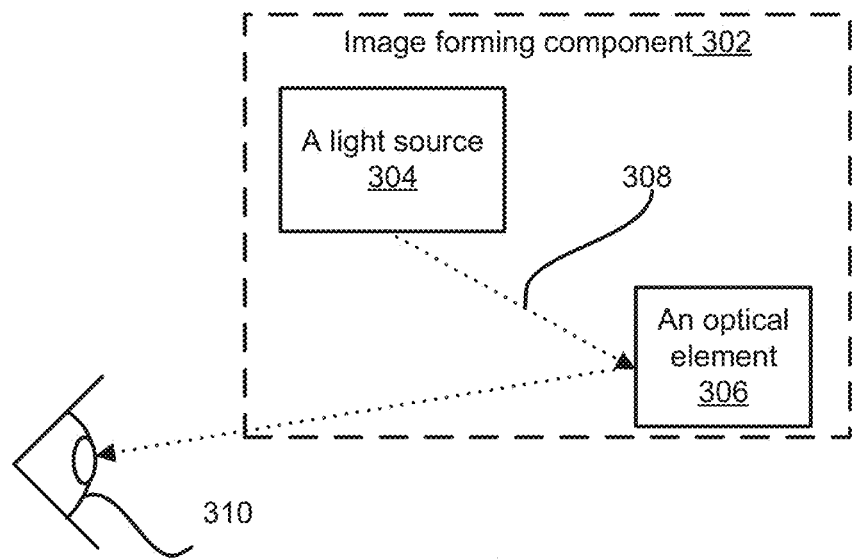
FIG. 3 illustrates a configuration of an image forming component comprising a light source and an optical element, in accordance with one or more implementations.

FIG. 3 illustrates an implementation of an image forming component 302. The image forming component 302 may include one or more of a light source 304, an optical element 306, and/or other components. The light source 304 may be configured to emit light rays forming images, including light ray 308. The optical element 306 may be configured to receive the light rays generated by light source 306. The optical element 306 may be configured to provide the light rays to an eye 310 to present the images over an angular portion of a user's field-of-view. Light rays from an ambient environment may pass through optical element 306 and reach eye 310.

Figure 4:
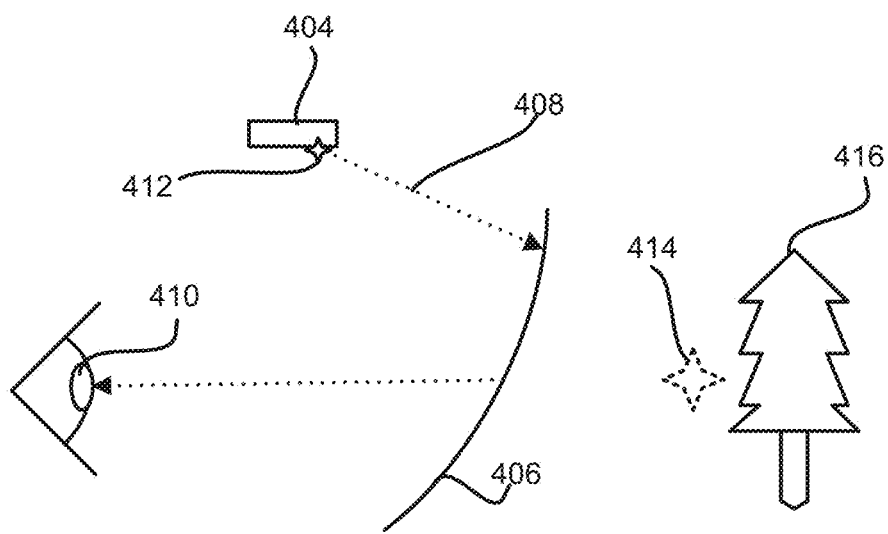
FIG. 4 illustrates a configuration of a light source and an optical element of an image forming component, in accordance with one or more implementations.

FIG. 4 illustrates a configuration of a light source 404 and an optical element 406 of an image forming component, in accordance with one or more implementations. The optical element 406 may comprise, and/or may be part of, a visor portion of a headset. The light source 404 may be configured to emit light rays, including light ray 408. The light rays may form images, including image 412. The light rays may be received by optical element 406 and provided to an eye 410 of a user. The light rays received by eye 410 may form virtual content 414 (e.g., a virtual object) perceived to lie within three-dimensional space in the user's field of view. The virtual content 414 may be superimposed over the user's view of real-world objects, including real-world object 416.

The implementation of a single image forming component to provide light rays to an eye of a user as shown in FIG. 3 and FIG. 4 may be limited in the field of view over which virtual content may be presented. One or more implementations of system 100 presented herein may utilize a set of image forming components to provide images to individual eyes. Individual image forming components in a set of image forming component may be configured to direct light rays over a specified angular portion of a user's field of view. For example, utilizing at least two image forming components per eye may facilitate providing a first set of light rays over a first angular portion of the user's field of view corresponding to central vision and a second set of light rays over a second angular portion of the user's field of view corresponding to peripheral vision.

Returning to FIG. 1, in some implementations, depth sensor 120 may be configured to generate output signals conveying depth information and/or other information. Depth information may include distance, or range, of real-world surfaces and/or objects from depth sensor 120, and/or other information. In some implementations, depth information may be provided in the form of a point cloud. A point cloud may include a set of points. Individual points may represent individual surfaces within the real-world. The depth information may specify, for individual points, one or more of an individual distance of the point from depth sensor 120, an individual orientation of the point with respect to depth sensor 120, and/or other information. By way of non-limiting illustration, depth sensor 120 may generate output signals conveying distance of surfaces of a user's hands and/or other objects. In some implementations, shape of an object, orientation of a surface and/or object, and/or other information may be determined from depth information. In some implementations, depth sensor 120 may comprise one or more of a time-of-flight sensor, a structured light sensor, an unstructured light sensor, an active stereo pair, a passive stereo pair, and/or other depth sensing devices.

In some implementations, mobile computing platform 122 may be configured to display two-dimensional representations of virtual content and/or perform other functions. The mobile computing platform 122 may include one or more of a set of one or more physical processors 124, one or more sensors 136, a display 138, non-transitory electronic storage 134, and/or other components. The mobile computing platform 122 may comprise a handheld computing platform and/or other types of mobile computing platforms. A handheld computing platform may include one or more of a mobile phone, a smartphone, a tablet computer, a PDA, a smartwatch, and/or other computing platforms.

An individual sensor of one or more sensors 136 may include one or more of a proximity sensor, an image sensor (e.g., for front and/or rear-facing cameras), a color sensor, and/or other sensors. A proximity sensor may be configured to generate output signals conveying presence of real-world objects and/or surfaces at or near display 138 and/or proximity sensor. A proximity sensor may have a threshold distance at which the sensor may be activated to convey a detection of presence of a surface and/or object at or near display 138 and/or proximity sensor. Outside the threshold distance the proximity sensor may be inactive thereby conveying absence of a surface and/or object at or near display 138 and/or the proximity sensor. By way of non-limiting illustration, a proximity sensor may be configured to emit an electromagnetic field and/or electromagnetic radiation (e.g., infrared) and detect changes in the field and/or a return signal.

Image sensor may be configured to generate output signals conveying visual information and/or other information. Visual information may specify visual content within a field of view of the image sensor. The visual content may include real-world objects and/or surfaces present in the real-world. The visual information may specify visual content in the form of pixels in an image. Pixels may be defined by one or more of location, color, transparency, and/or other information. In some implementations, output signals of an image sensor may convey presence of real-world objects and/or surfaces at or near display 138 and/or the image sensor. By way of non-limiting illustration, a depiction of a real-world object (e.g., a user object such as a hand) within an image may convey presence of the real-world object at or near display 138 and/or the image sensor. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

The display 138 of mobile computing platform 122 may be configured to present visual content, receive input, and/or perform other functions. Visual content presented by display may include one or more of images, images forming virtual content, text, video, and/or visual content. In some implementations, display 138 may be configured to receive user input comprising tactile input. By way of non-limiting illustration, display 138 may comprise a touchscreen display and/or other type of display screen.

Figure 6:
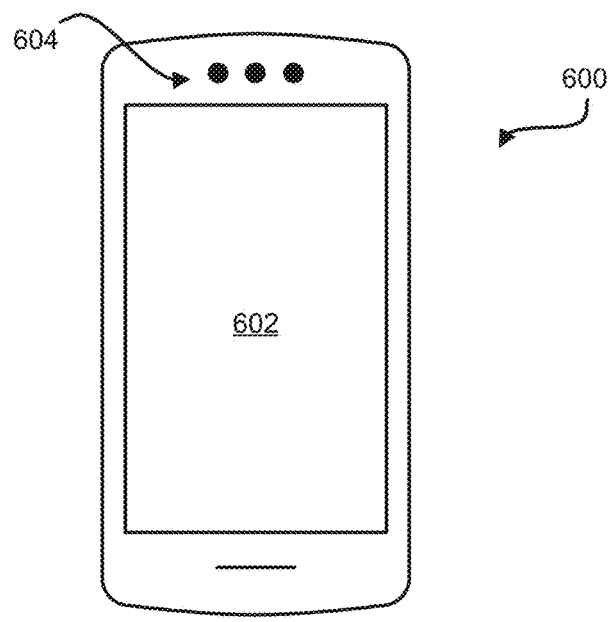
FIG. 6 illustrates an exemplary mobile computing platform.

By way of non-limiting illustration in FIG. 6, an exemplary mobile computing platform 600 is shown. The mobile computing platform 600 may be the same as or similar to mobile computing platform 122 (FIG. 1). The mobile computing platform 600 may comprise a smartphone and/or other mobile computing platform. The mobile computing platform 600 may include one or more of a display 602, a sensor array 604, and/or other components. The sensor array 604 may include one or more sensors (e.g., the same as or similar to one or more sensors 136 in FIG. 1). The sensor array 604 may include one or more of a proximity sensor, an image sensor (e.g., for a camera), a color sensor, and/or other sensors. The sensor array 604 may be disposed on a specific part of mobile computing platform 600. By way of non-limiting illustration, sensor array 604 may be disposed in a top portion (e.g., top edge) of the mobile computing platform 600 and/or in other locations.

In some implementations, display 602 may be configured to present visual content. In some implementations, display 602 may be configured to receive user input comprising tactile input. By way of non-limiting illustration, display 602 may comprise a touchscreen display and/or type of display screen.

Returning to FIG. 1, the set of one or more physical processors 124 of mobile computing platform 122 may be configured by machine-readable instructions 126. Executing machine-readable instructions 126 may cause mobile computing platform 122 to facilitate user interactions with virtual content having two-dimensional representations and/or three-dimensional representations. The machine-readable instructions 126 may include one or more of an input component 128, a presentation component 130, a presence component 132, and/or other components.

The presentation component 130 may be configured to effectuate presentation of information on display 138. The presentation component 130 may be configured to effectuate presentation of images forming virtual content on display 138. The images may form two-dimensional representations of virtual content. The presentation component 130 may be configured to effectuate presentation of one or more user interfaces on display 138 (see, e.g., user interface shown in FIG. 13 and described herein).

The presentation component 130 may be configured to obtain information defining virtual content. This may include one or more of receiving, requesting, retrieving, and/or obtaining this information in other ways. The information defining the virtual content may include information defining one or both of two-dimensional and/or three-dimensional representations of the virtual content. The information defining virtual content may be obtained from one or more of non-transitory electronic storage 134 of mobile computing platform 122, one or more external resources 116, and/or other sources. In some implementations, the information defining virtual content may be in the form of an electronic file, a reference to an electronic file (e.g., a network address, URL, and/or other reference), and/or other forms. By way of non-limiting illustration, an electronic file may include information specifying one or both of 2D and/or 3D geometry and/or dimensions of virtual content. In some implementations, content presented on mobile computing platform 122 may include streaming content (e.g., streaming video).

Figure 13:
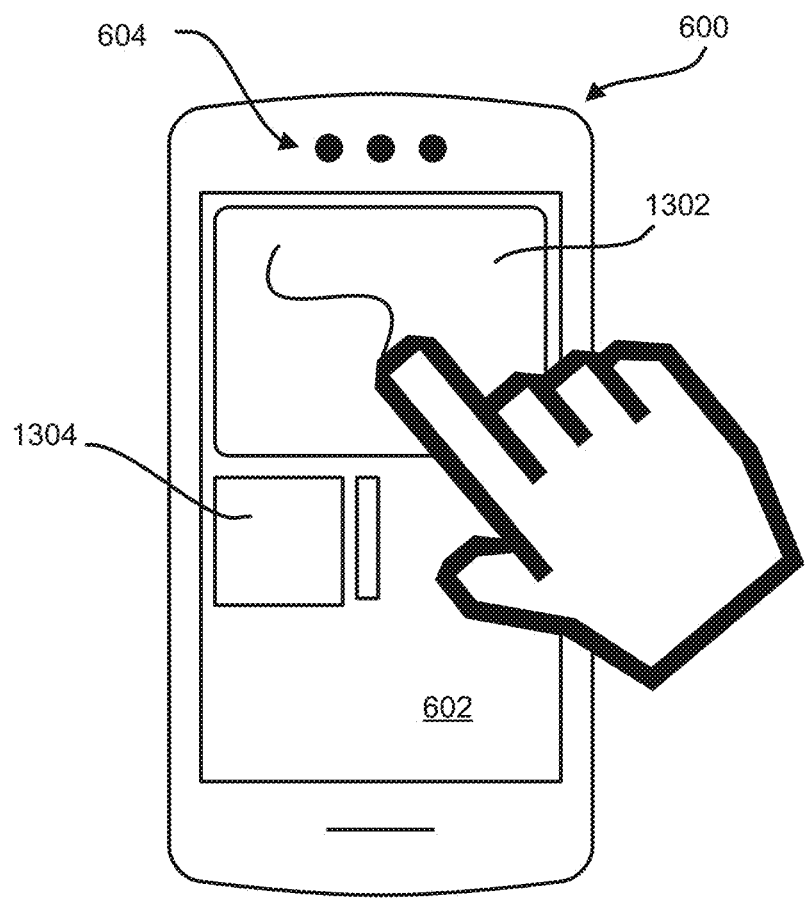
FIG. 13 illustrates a user interface presented on a display of a mobile computing platform.

The input component 128 may be configured to obtain user input. The user input may comprise tactile input via display 138, and/or other input mechanisms. In some implementations, user input into display 138 may include input to create virtual content. By way of non-limiting illustration, FIG. 13 shows a user interface presented on display 602 and configured to receive user input for creating virtual content. The user interface may include an input portion 1302 where a user may provide tactile input associated with drawing virtual content. By way of non-limiting illustration, the input portion 1302 may be a note pad where a user may input words, drawings, notes, and/or other content. The user interface may include other user interface portions. By way of non-limiting illustration, the user interface may include a selector portion 1304 and/or other portions. The selector portion 1304 may be associated with selection of one or more of color, line width, background color, and/or other features associated with content created by a user via tactile input into input portion 1302. It is noted that the input portion 1302 of the user interface may be displayed at or near a portion of display 602 that may be adjacent sensor array 604. By way of non-limiting illustration, input portion 1302 may be disposed and/or arranged on a top half (and/or top third, top quarter, and/or other portion) of display 602 adjacent sensor array 604. This configuration may facilitate better presence detection by individual sensors in sensor array 604 when the user makes a gesture to "move" virtual content shown in input portion 1302 to a three-dimensional representation in the interactive space.

Returning to FIG. 1, presence component 132 of mobile computing platform 122 may be configured to obtain output signals generated by one or more sensors 136 and/or determine, from the output signals, presence and/or absence of one or more user objects at or near display 138 and/or one or more sensors 136. In some implementations, detection of presence of a user object based on output signals of a proximity sensor may be based on an activation of the proximity sensor and/or other sensors. The provision of output from the proximity sensor may itself comprise the detection of presence. In some implementations, detection of presence based on output signals of an image sensor may be based on image analysis of an image generated from the output signals. Image analysis may include techniques such as one or more of object recognition, object identification, object triangulation (e.g., determination of distance of the object from the image sensor), and/or other image analysis techniques.

In FIG. 1, the set of one or more physical processors 104 of headset 102 may be configured by machine-readable instructions 106. Executing machine-readable instructions 106 may cause one or more physical processors 104 to facilitate user interactions with virtual content having two-dimensional representations and/or three-dimensional representations. The machine-readable instructions 106 may include one or more of a gesture component 108, a presence component 110, a control component 111, and/or other components.

In some implementations, gesture component 108 may be configured to determine user input for manipulating virtual content having one or both of a two-dimensional representation and/or a three-dimensional representation. The user input may comprise gesture-based input and/or other input. The gesture-based input may include one or more gestures directed to "moving" virtual content from a two-dimensional representation on display 138 of mobile computing platform 122 to a three-dimensional representation within an interactive space provided by headset 102. In some implementations, such input may comprise a sequence of gestures. The sequence may include one or more of grabbing, releasing, and/or other gestures.

In some implementations, gesture-based user input may be derived from one or more of the output signals of depth sensor 120, output signals from one or more other sensors, and/or other sources. The gesture component 108 may be configured to obtain sensor output from depth sensor 120 and/or other sensors. The gesture component 108 may be configured to determine user input by detection and/or recognition of one or more user objects based on sensor output of depth sensor 120. A user object may be detected and/or recognized based on a point cloud and/or subset of a point cloud having points lying on one or more surfaces of the user object. Detection and/or recognition of a user object may be based on a point cloud or subset of the point cloud forming a shape that may be representative of the user object. The user object may include one or more of a hand, a finger, a set of fingers, an arm, an implement (e.g., an apparatus held by the user), and/or other objects.

In some implementations, gesture component 108 may be configured to identify gestures and/or actions being performed by a user object. A gesture and/or action may include one or more of clicking, reaching, grabbing, moving, releasing, swiping, pinching, pulling, throwing, pointing, and/or other gestures and/or actions. By way of non-limiting illustration, gesture component 108 may utilize one or more gesture recognition techniques to identify one or more gestures and/or actions being performed by the user object. The gesture component 108 may be configured to provide one or more identified gestures and/or actions as user input for manipulating virtual content.

It is noted that while descriptions of detecting and/or recognizing user objects are directed to use of depth sensor 120 generating depth information comprising a point cloud, this is for illustrative purposes only and are not to be considered limiting. In some implementations, user object detection and/or recognition may be accomplished using other approaches and/or other devices. For example, an image sensor of a camera may be configured to generate visual information defining images of a real-world environment within a field-of-view of the image sensor. User object detection and/or recognition may be accomplished using one or more image-based approaches. The one or more image-based approaches may include one or more of computer vision, object recognition, SIFT, SURF, position triangulation, and/or other techniques. For example, while a point within a point cloud may represent a surface of a fingertip and may be used to track the location of the fingertip in three-dimensional space, similar tracking may be carried out using one or more image-based approaches including one or more identifying the fingertip in an image, tracking the fingertip over multiple images, and/or other operations. In this manner, a location determined for the fingertip via an image-based approach may be treated in the same or similar manner as a point within a point cloud representing the surface of the fingertip.

In some implementations, positions of one or more features of a hand may be determined through one or more iterations including operations of determining estimated positions of individual features from estimated positions of other ones of the features. Such an iterative procedure may be performed as output from depth sensor 120 is obtained. The output may be obtained based on a sampling rate of depth sensor 120.

In some implementations, an estimated position of a first feature may be determined from depth information and/or other information. In an iteration, an estimated position of a second feature may be determined from the estimated position of the first feature. An estimated position of a set of features may be determined from the estimated position of the second feature. Another estimated position of the first feature may be determined from the estimated position of the set of features. An estimated position of the set of features may include a set of positions wherein individual positions in the set of positions correspond to individual features in the set of features. The estimated positions of the first feature may be compared to determine a difference between those positions.

Based on the difference being equal to or below a threshold distance, the positions of one or more of the first feature, second feature, set of features, and/or other features may be specified by the corresponding estimated featured positions used in the current iteration. The threshold distance may be within a range of 1 to 10 millimeters, and/or other ranges.

Based on the difference being equal to or above a threshold distance, one or more further iterations may be performed. At an iteration where a difference in estimated positions of the first feature may be below a threshold distance, the positions of one or more features may be specified by the estimated positions of the one or more features used in that iteration.

By way of non-limiting illustration, given an estimated position of a first feature of a hand, a position of a second feature may be estimated based on one or more of a range of distances from the position of the first feature that may be anatomically possible to correspond to the position of the second feature, one or more directions from the position of the first feature that may be anatomically possible to point to the position of the second feature, and/or other information. By way of non-limiting illustration, given a position of a wrist of a hand, a position of a thumb may be determined based on one or more of a range of distances from the wrist position that may be anatomically possible to correspond to the position of the thumb, one or more directions from the position of the wrist that may be anatomically possible to point to the position of the thumb, and/or other information.

The presence component 110 may be configured to obtain, from mobile computing platform 122, indications of presence and/or absence of one or more user objects at or near display 138, and/or other information. Obtaining such an indication may include one or more of requesting it from mobile computing platform 122, receiving it from mobile computing platform 122, retrieving it from mobile computing platform 122, and/or other techniques.

In some implementations, control component 111 may be configured to, responsive to obtaining an individual indication of presence of an individual user object at or near display 138 and determining an individual gesture (or gestures) being performed by the individual user object, control one or more image forming components 114 to form images of virtual content. In some implementations, controlling one or more image forming components 114 may include controlling individual light sources, individual optical elements, and/or other components. The virtual content may be a three-dimensional representation of virtual content currently presented on display 138 of mobile computing platform 122. The images of the virtual content may be formed such that the virtual content may be superimposed over the user's view of the user object over a duration of the performance of the individual gesture by the user object and/or until a subsequent gesture may be determined. By way of non-limiting illustration, control component 111 may be configured to, responsive to determining a subsequent gesture (or gestures) being performed by the individual user object, control one or more image forming components 114 to form an image of the virtual content such that the virtual content may be superimposed over the user's view of the real-world environment at or near a location of the performance of the subsequent gesture. For example, the first gesture may be a "grab" and the subsequent gesture may be a "release" such that the image forming the virtual content may be configured such that the virtual content may be perceived to be located at the location where the release gesture was performed. The virtual content may be perceived as being "pinned" at the location of release.

The control component 111 may be configured to determine virtual content to present to a user. Virtual content may include one or more virtual objects having three-dimensional representations within the interactive space and/or two-dimensional representations when presented on display 138 of mobile computing platform 122. The control component 111 may be configured to obtain information defining three-dimensional representations of the virtual content. The control component 111 may be configured to obtain the information from one or more of mobile computing platform 122, one or more external resources 116, and/or other sources. By way of non-limiting illustration, control component 111 may be configured to obtain one or more of an electronic file including information defining virtual content, a reference to an electronic file (e.g., a network address, URL, and/or other reference), and/or other forms of information defining virtual content. In some implementations, control component 111 may obtain streaming content, e.g., streaming videos. Such content may be presented on a virtual object, such as a virtual screen or browser shown in the interactive space. By way of non-limiting illustration, mobile computing platform 122 may communicate one or more of information that may be interpreted by headset 102 (e.g., URL linking to a video, and/or other information), reproduction time of a video to keep headset 102 and mobile computing platform 122 in sync, and/or other information. In some implementations, for videos, control (e.g., pause, stop, play) may be provided by mobile computing platform 122 and reflected in the presentation of virtual content by headset 102.

In some implementations, control component 111 may be configured to differentiate between presence of a user object to perform a gesture to move virtual content, and presence of a user object to provide input via display 138. By way of non-limiting illustration, presence of a user object to provide input via display 138 may include (e.g., simultaneously and/or contemporaneously) an indication of presence by a sensor and indication of tactile input via display 138. Presence of a user object to perform a gesture may be indicated by obtaining, from mobile computing platform 122, indication of presence of user object and identification of a gesture, absent indication of tactile input via display 138.

By way of non-limiting illustration, responsive to one or more of obtaining an indication of presence of a user object at or near display 138, determining a first gesture is being performed by the user object, and obtaining the indication of user input via display 138, control component 111 may be configured to determine that the first gesture is associated with the user input (for example, to create virtual content), and not a desire to interact with a three-dimensional representation of virtual content. In that case, control component 111 may determine that images forming a three-dimensional representation of virtual content should not be generated.

Figure 7:
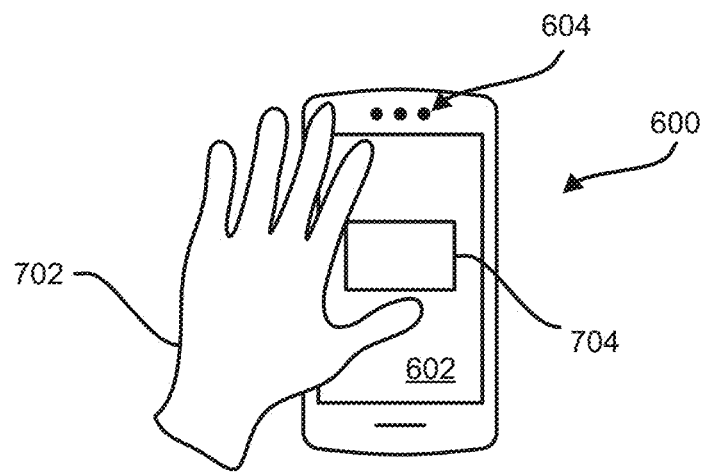
FIG. 7 illustrates a view of an interactive space including an exemplary user interaction.

In FIG. 7, a user interaction with a two-dimensional representation of virtual content 704 is illustrated. The illustration in FIG. 7 is intended to represent a user's field of view of an interactive space while utilizing a headset, such as headset 102 (FIG. 1) and/or HMD 300 (FIG. 3). The view may include views of real-world objects and/or virtual content. The real-world objects may include mobile computing platform 600 and/or other real-world objects. The virtual content may include virtual content 704 having a two-dimensional representation when presented via display 602 of mobile computing platform 600. For illustrative purposes, virtual content 704 is depicted as a square.

Figure 8:
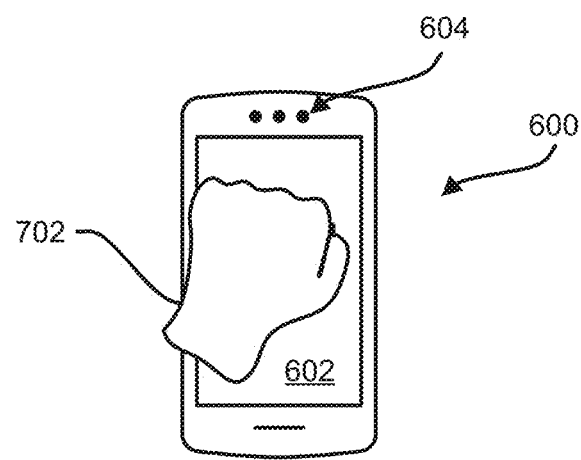
FIG. 8 illustrates a view of an interactive space including an exemplary user interaction.

A user may interact with virtual content 704 via user object 702. The user object 702 may comprise the user's hand. User interaction may comprise gesture-based interactions. In some implementations, user interaction may start with user object 702 coming into proximity of mobile computing platform 600. In some implementations, proximity may refer to a distance of user object 702 to display 602 of mobile computing platform 600 that may activate a proximity sensor and/or other sensor included in sensor array 604. The mobile computing platform 600 may communicate an indication of presence of user object 702 at or near display 602 to the headset based on activation of at least one sensor of sensor array 604. Concurrently, subsequently, and/or prior to a determination of presence of user object 702, the headset may be configured to detect and/or recognize one or more gestures performed by user object 702. By way of non-limiting illustration, FIG. 8 shows a first gesture being performed by user object 702 while at or near display 602. The first gesture may include a "grab" gesture, and/or other gesture.

Figure 9:
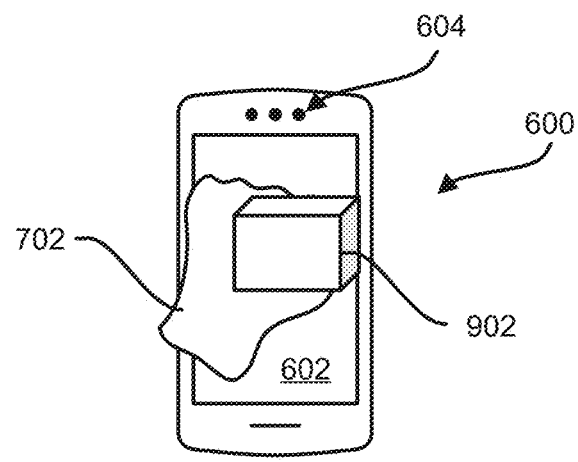
FIG. 9 illustrates a view of an interactive space including an exemplary user interaction.

In FIG. 9, responsive to obtaining the indication of presence of user object 702 at or near display 602, and determining the first gesture is being performed by user object 702, one or more image forming components of the headset may be controlled to form images of second virtual content 902 superimposed over the user's view of user object 702. The second virtual content 902 may be a three-dimensional representation of first virtual content 704 (FIG. 7). For illustrative purposes, second virtual content 902 may comprise a cube. The second virtual content 902 may be presented as being superimposed over user object 702 over a duration of the performance of the first gesture and/or until performance of one or more other gestures is determined.

Figure 10:
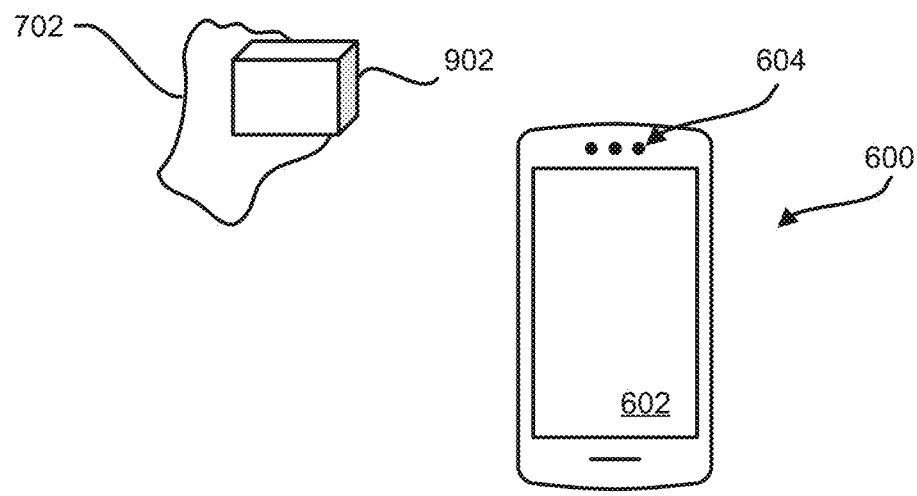
FIG. 10 illustrates a view of an interactive space including an exemplary user interaction.

FIG. 10 illustrates second virtual content 902 continuing to be superimposed over user object 702 while the first gesture (e.g., "grab") is still being performed and the user is moving user object 702 in the real-world environment. The user may move second virtual content 902 throughout the interactive space to a desired location.

Figure 11:
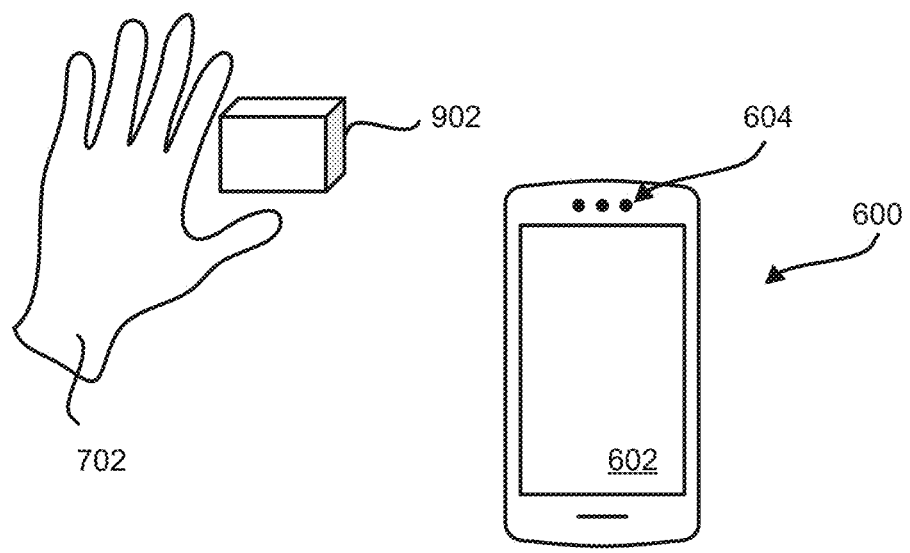
FIG. 11 illustrates a view of an interactive space including an exemplary user interaction.
Figure 12:
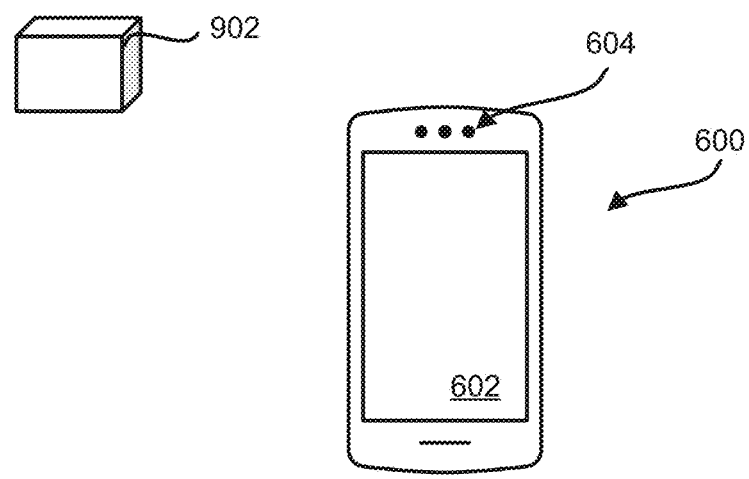
FIG. 12 illustrates of a view of an interactive space including a mobile computing platform and virtual content having a three-dimensional representation.

FIG. 11 shows a user interaction including performing a second gesture. The second gesture may include a "release" gesture, and/or other gestures. The second gesture may cause second virtual content 902 to be perceived as being "pinned" at the location of the performance of the second gesture. FIG. 12 shows the result of second virtual content 902 being positioned in the interactive space at the location of the performance of the second gesture.

It is noted that while the descriptions and depictions provided herewith describe "moving" virtual content from a two-dimensional representation on a display of a mobile computing platform to a three-dimensional representation in an interactive space, this is for illustrative purpose and not to be considered limiting. For example, it is within the scope of this disclosure that virtual content may be "moved" from a three-dimensional representation in an interactive space to a two-dimensional representation on a display of a mobile computing platform. This process may be carried out in the same or similar manner as "moving" virtual content from a two-dimensional representation on a display of a mobile computing platform to a three-dimensional representation in an interactive space, albeit in reverse. Accordingly, those skilled in the art may appreciate some modifications to the system components described herein that may be needed to perform the move from three-dimensional representation within an interactive space to two-dimensional representation on a display of a mobile computing platform.

For example, a user object may be moved within proximity of virtual content within an interactive space (e.g., the same as or similar to the depiction in FIG. 11), and a gesture (e.g., grab) performed to cause the virtual content to be superimposed over the view of the user object (e.g., the same as or similar to the depiction in FIG. 10). The user object and virtual content may be moved to a proximity of a mobile computing platform such that a proximity sensor (or other sensor) of the mobile computing platform may be activated (e.g., the same as or similar to the depiction in FIG. 9). The user object may then perform a second gesture (e.g., release) conveying the "move" of the virtual content into the two-dimensional representation on the display (e.g., the same as or similar to the depiction in FIG. 7). In some implementations, for virtual content comprising a virtual world, the three-dimensional presentation may comprise a three-dimensional view of the virtual world, and the two-dimensional representation may comprise a "fly over" two-dimensional version of the virtual world.

Returning to FIG. 1, one or more of processor(s) 104, one or more image forming components 114, depth sensor 120, mobile computing platform 122, external resource(s) 116, and/or other components may be operatively linked via one or more electronic communication links. For example, such electronic communication links may be established, at least in part, via network(s) 118. Network(s) 118 may comprise one or both of wired and/or wireless communications. It will be appreciated that this is not intended to be limiting and that the scope of this disclosure includes implementations in which one or more of processors 104, one or more image forming components 114, depth sensor 120, mobile computing platform 122, external resource(s), and/or other components may be operatively linked via some other communication media. By way of non-limiting illustration, headset 102 (and its components) may include its own network, and the network used to communicate between headset 102 and mobile computing platform 122 may be a separate network.

The external resource(s) 116 may include sources of information, hosts, external entities participating with system 100, providers of virtual content, and/or other resources. In some implementations, some or all of the functionality attributed herein to external resource(s) 116 may be provided by resources included in system 100.

The processor(s) 104 may include and/or have access to electronic storage 112, and/or other components. The processor(s) 104 may include communication lines or ports to enable the exchange of information with a network and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 112 may comprise non-transitory electronic storage media that electronically stores information. The electronic storage media of electronic storage 112 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 112 may include one or more virtual storage resources (e.g., cloud storage, a virtual private network, and/or other virtual storage resources). Electronic storage 112 may store software algorithms, information determined by processor(s) 104, information received from other components of system 100, and/or other information that enables processor(s) 104 to function as described herein.

Processor(s) 104 is configured to provide information-processing capabilities for headset 102. As such, processor(s) 104 may include one or more of a physical processor, a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processors 104 may be configured to execute components 108, 110, 111, and/or other components. Processor(s) 104 may be configured to execute component 108, 110, 111, and/or other components by software; hardware; firmware; some combination of software, hardware, and/or firmware; and/or other mechanisms for configuring processing capabilities on processor(s) 104.

It should be appreciated that although components 108, 110, and 111 are illustrated in FIG. 1 as being co-located within a single processing unit, in implementations in which processor(s) 104 includes multiple processing units, one or more of components may be located remotely from the other components. The description of the functionality provided by an individual component is for illustrative purposes and is not intended to be limiting, as a given component may provide more or less functionality than is described. For example, a given component may be eliminated, and some or all of its functionality may be provided by another component. As another example, processor(s) 104 may be configured to execute one or more additional components that may perform some or all of the functionality attributed to individual ones of components 108, 110, 111, and/or other components.

The processor(s) 124 of mobile computing platform 122 may include and/or have access to electronic storage 134, and/or other components. The processor(s) 124 may include communication lines or ports to enable the exchange of information with a network and/or other components of system 100. Illustration of processor(s) 124 in FIG. 1 is not intended to be limiting. The processor(s) 124 may include a plurality of hardware, software, and/or firmware components operating together to provide the functionality attributed herein to processor(s) 124. For example, processor(s) 124 may be implemented by a cloud of computing platforms operating together as processor(s) 104.

Electronic storage 134 may comprise non-transitory electronic storage media that electronically stores information. The electronic storage media of electronic storage 134 may include one or both of system storage that is provided integrally (i.e., substantially non-removable) with processor(s) 124 and/or removable storage that is removably connectable to processor(s) 124 via, for example, a port or a drive. A port may include a USB port, a firewire port, and/or other port. A drive may include a disk drive and/or other drive. Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 124, information received from other components of system 100, and/or other information that enables processor(s) 124 to function as described herein.

Processor(s) 124 is configured to provide information-processing capabilities in mobile computing platform 122. As such, processor(s) 124 may include one or more of a physical processor, a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include one or more processing units. These processing units may be physically located within the same device, or processor(s) 124 may represent processing functionality of a plurality of devices operating in coordination. The processor(s) 124 may be configured to execute components 128, 130, 132, and/or other components. Processor(s) 124 may be configured to execute component 128, 130, 132, and/or other components by software; hardware; firmware; some combination of software, hardware, and/or firmware; and/or other mechanisms for configuring processing capabilities on processor(s) 124.

It should be appreciated that although components 128, 130, and 132 are illustrated in FIG. 1 as being co-located within a single processing unit, in implementations in which processor(s) 124 includes multiple processing units, one or more of components may be located remotely from the other components. The description of the functionality provided by an individual component is for illustrative purposes and is not intended to be limiting, as a given component may provide more or less functionality than is described. For example, a given component may be eliminated, and some or all of its functionality may be provided by another component. As another example, processor(s) 124 may be configured to execute one or more additional components that may perform some or all of the functionality attributed to individual ones of components 128, 130, 132, and/or other components.

Figure 2:
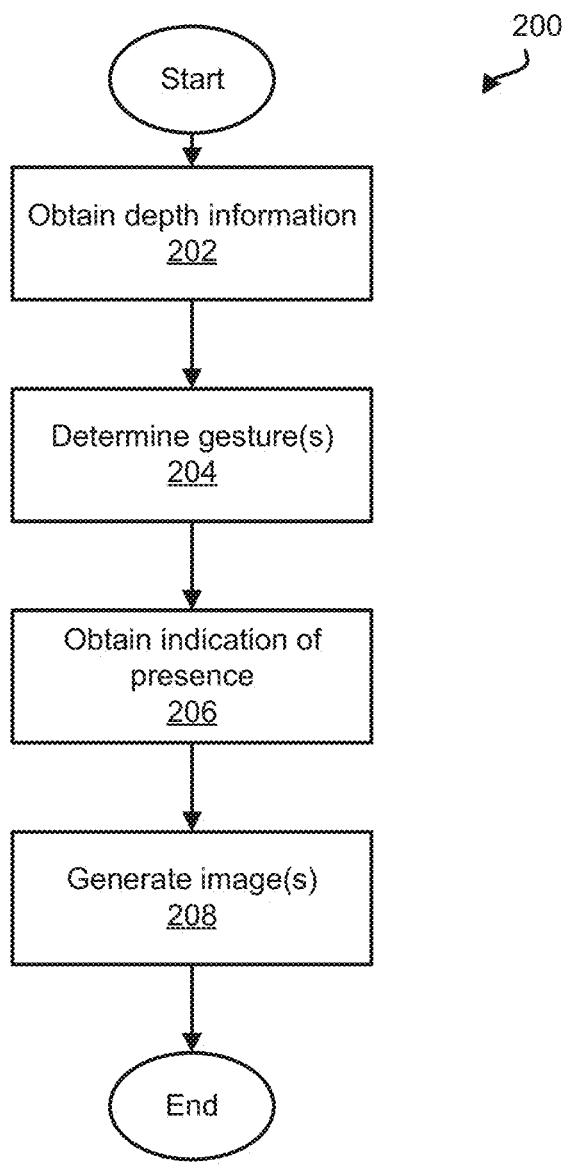
FIG. 2 illustrates a method to facilitate user interactions with virtual content having two-dimensional representations and/or three-dimensional representations, in accordance with one or more implementations.

FIG. 2 illustrates a method 200 to facilitate user interactions with virtual content having two-dimensional representations and three-dimensional representations, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in and/or using a system, such as system 100 shown in FIG. 1 and described herein. One or more physical processors may include one or more devices executing one or more of the operations of method 200 in response to instructions stored electronically on electronic storage media. The one or more processing devices may include one or more devices configured through hardware, firmware, and/or software to be specifically designed for execution of one or more of the operations of method 200.

At an operation 202, depth information conveying ranges of surfaces within a real-world environment may be obtained. In some implementations, operation 202 may be performed by one or more physical processors executing a gesture component the same as or similar to gesture component 108 (shown in FIG. 1 and described herein).

At an operation 204, one or more gestures being performed by a user object of a user may be determined. In some implementations, operation 204 may be performed by one or more physical processors executing a gesture component the same as or similar to gesture component 108 (shown in FIG. 1 and described herein).

At an operation 206, an indication of presence of the user object at or near a display of a mobile computing platform may be obtained. The mobile computing platform may be configured to present first virtual content. The first virtual content may have a two-dimensional representation. In some implementations, operation 206 may be performed by one or more physical processors executing a presence component the same as or similar to presence component 110, and/or other components (shown in FIG. 1 and described herein).

At an operation 208, responsive to obtaining the indication of presence of the user object at or near the display and determining a first gesture is being performed by the user object, images of second virtual content may be generated. The second virtual content may be a three-dimensional representation of the first virtual content. The images of the second virtual content may be formed such that the second virtual content may be superimposed over the user's view of the user object over a duration of the performance of the first gesture. In some implementations, operation 208 may be performed by one or more physical processors executing a control component the same as or similar to control component 111, and/or other components (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to facilitate user interactions with virtual content having two-dimensional representations and three-dimensional representations, the system comprising:
   a mobile computing platform comprising:
      a display;
      a first sensor configured to generate output signals conveying presence of a user object of a user at or near the display;
      a first set of one or more physical processors configured by machine-readable instructions to:
         effectuate presentation of first virtual content on the display, the first virtual content having a two-dimensional representation;
         obtain the output signals generated by the first sensor; and
         determine, from the output signals generated by the first sensor, the presence of the user object at or near the display;
   a headset configured to be installed on a head of the user;
   a depth sensor held by the headset configured to generate output signals conveying ranges of surfaces within a real-world environment;
   one or more image forming components held by the headset configured to generate light rays to form images of virtual content, the one or more image forming components being configured such that when the headset is installed on the head of the user, the images are superimposed over a view of the real world environment to create the interactive space; and
   a second set of one or more physical processors coupled to the headset, the second set of one or more physical processors being configured by machine-readable instructions to:
      obtain the output signals from the depth sensor;
      determine, from the output signals of the depth sensor, one or more gestures being performed by the user object;
      obtain, from the mobile computing platform, an indication of the presence of the user object at or near the display; and
      responsive to obtaining the indication of presence of the user object at or near the display and determining a first gesture is being performed by the user object, control the one or more image forming components to form images of second virtual content, the second virtual content being a three-dimensional representation of the first virtual content, wherein the images of the second virtual content are formed such that the second virtual content is superimposed over the user's view of the user object over a duration of the performance of the first gesture.

2. The system of claim 1, wherein the second set of one or more physical processors are further configured by machine-readable instructions to:
   responsive to determining a second gesture of the user object being performed following the first gesture, control the one or more image forming components to form an image of the second virtual content such that second virtual content is superimposed over the user's view of the real-world environment at or near a location of the performance of the second gesture.

3. The system of claim 2, wherein the user object is a hand, the first gesture is a grab, and the second gesture is a release.

4. The system of claim 1, wherein controlling the one or more image forming components to form images of the second virtual content, the second virtual content being the three-dimensional representation of the first virtual content, comprises:
   obtaining information defining the three-dimensional representation of the first virtual content; or
   obtaining a reference to the information defining the three-dimensional representation of the first virtual content.

5. The system of claim 4, wherein the information defining the first virtual content is obtained from the mobile computing platform or an external resource, and the reference is obtained from the mobile computing platform, wherein the reference identifies the external resource.

6. The system of claim 1, wherein the first set of one or more physical processors are further configured by machine-readable instructions to:
   effectuate presentation of a user interface on the display, the user interface being configured to receive user input for creating virtual content, such that the first virtual content is created based on user input via the user interface.

7. The system of claim 6, wherein the user interface is presented on a portion of the display that is adjacent to the first sensor of the mobile computing platform.

8. The system of claim 1, wherein the second set of one or more physical processors are further configured by machine-readable instructions to:
   obtain, from the mobile computing platform, an indication of user input being provided via the display; and
   responsive to obtaining the indication of presence of the user object at or near the display, determining the first gesture is being performed by the user object, and obtaining the indication of the user input, determine that the images of the second virtual content should not be generated.

9. The system of claim 8, wherein the display is a touchscreen and the user input is tactile input.

10. The system of claim 1, wherein the interactive space is an augmented reality environment.

11. A method configured to facilitate user interactions with virtual content having two-dimensional representations and three-dimensional representations, the method comprising:
   obtaining depth information conveying ranges of surfaces within a real-world environment;
   determining, from the depth information, one or more gestures being performed by a user object of a user;
   obtaining an indication of presence of the user object at or near a display of a mobile computing platform, the mobile computing platform presenting first virtual content, the first virtual content having a two-dimensional representation; and
   responsive to obtaining the indication of presence of the user object at or near the display and determining a first gesture is being performed by the user object, generating images of second virtual content, the second virtual content being a three-dimensional representation of the first virtual content, wherein the images of the second virtual content are formed such that the second virtual content is superimposed over the user's view of the user object over a duration of the performance of the first gesture;
   responsive to determining a second gesture of the user object being performed following the first gesture, generating an image of the second virtual content such that the second virtual content is superimposed over the user's view of the real-world environment at or near a location of the performance of the second gesture; and wherein the user object is a hand, the first gesture is a grab, and the second gesture is a release.

12. The method of claim 11, further comprising:
   obtaining information defining the three-dimensional representation of the first virtual content; or
   obtaining a reference to the information defining the three-dimensional representation of the first virtual content.

13. The method of claim 12, wherein the information defining the first virtual content is obtained from the mobile computing platform or an external resource, and the reference is obtained from the mobile computing platform, wherein the reference identifies the external resource.

14. The method of claim 11, further comprising:
   effectuating presentation of a user interface, the user interface being configured to receive user input for creating virtual content, such that the first virtual content is created based on user input via the user interface.

15. The method of claim 14, wherein the user interface is presented on a portion of the display that is adjacent to the first sensor of the mobile computing platform.

16. The method of claim 11, further comprising:
   obtaining an indication of user input being provided via the display; and
   responsive to obtaining the indication of presence of the user object at or near the display, determining the first gesture is being performed by the user object, and obtaining the indication of the user input, determining that the images of the second virtual content should not be generated.

17. The method of claim 16, wherein the display is a touchscreen and the user input is tactile input.

18. The method of claim 11, wherein the interactive space is an augmented reality environment.

* * * * *